July 14, 1931.    R. A. PARRY    1,814,227
BRICK MAKING MACHINE
Filed April 4, 1929    5 Sheets-Sheet 1

Inventor.
Robert A. Parry
by Heard Smith & Tennant.
Attys.

July 14, 1931.  R. A. PARRY  1,814,227
BRICK MAKING MACHINE
Filed April 4, 1929  5 Sheets-Sheet 2

Inventor.
Robert A. Parry
by Heard Smith & Tennant
Attys.

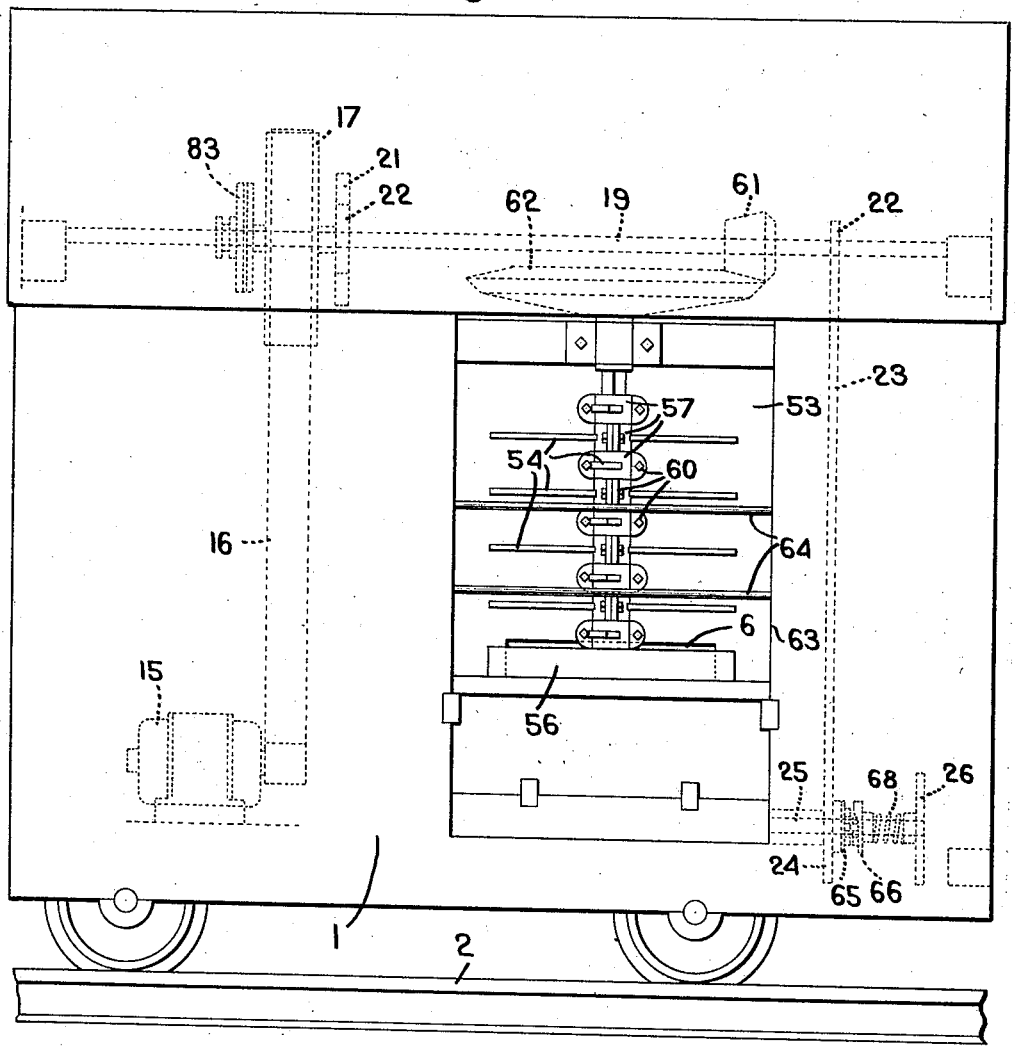
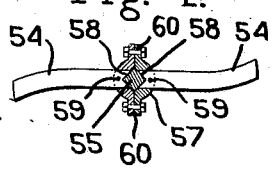

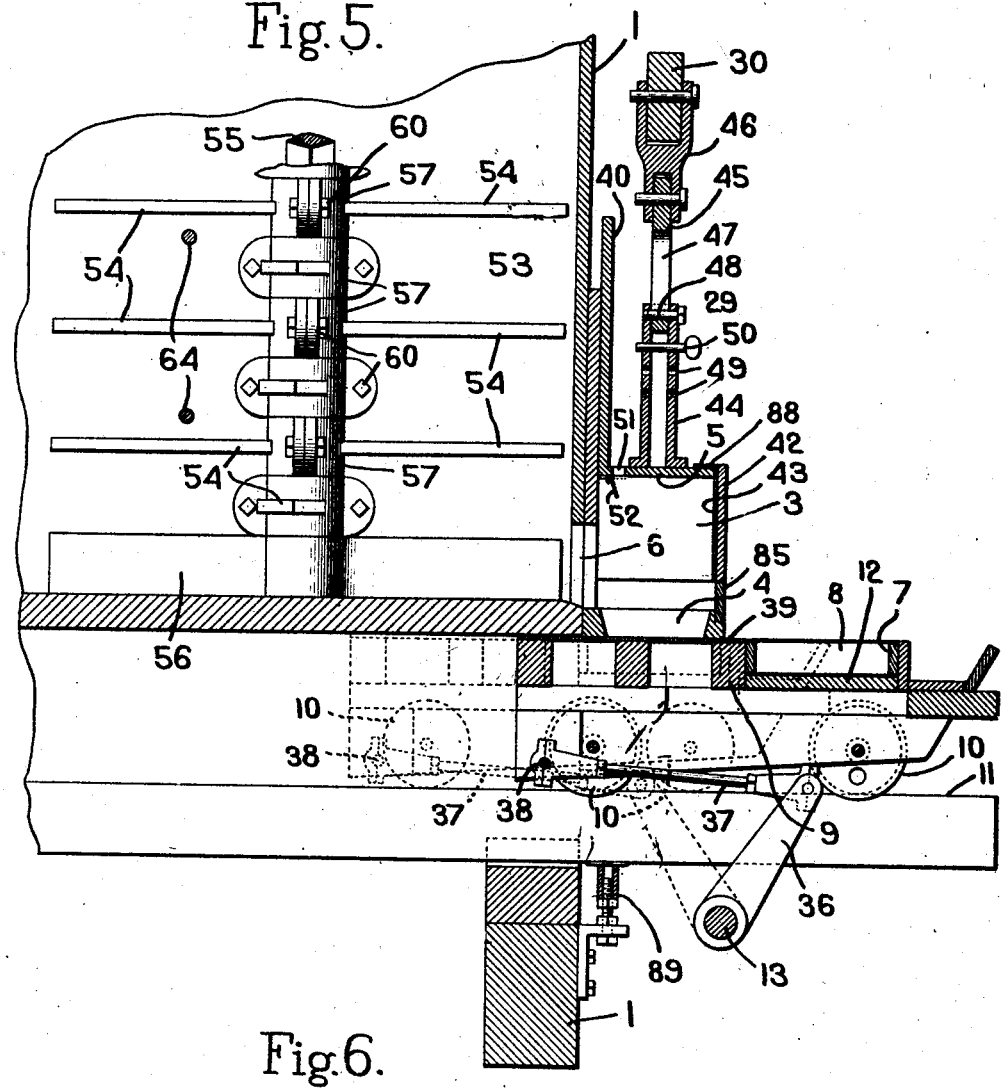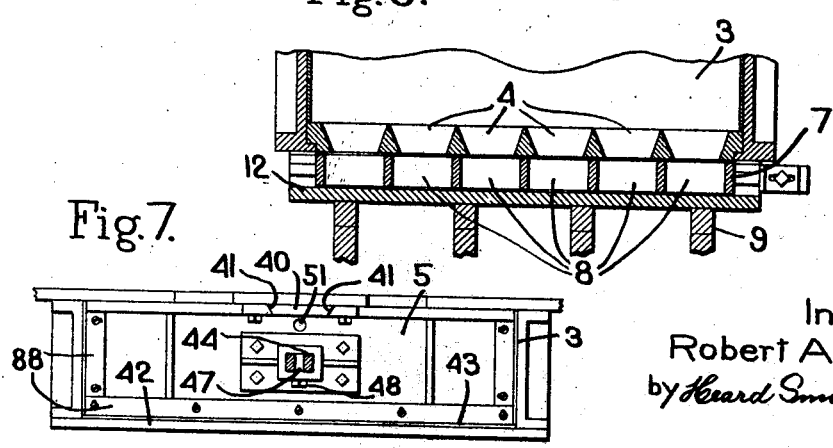

July 14, 1931.　　　　　R. A. PARRY　　　　　1,814,227
BRICK MAKING MACHINE
Filed April 4, 1929　　　5 Sheets-Sheet 5

Inventor.
Robert A. Parry
by Heard Smith & Tennant.
Attys.

Patented July 14, 1931

1,814,227

UNITED STATES PATENT OFFICE

ROBERT A. PARRY, OF BELMONT, MASSACHUSETTS, ASSIGNOR TO BOSTON BRICK COMPANY, OF CAMBRIDGE, MASSACHUSETTS, A CORPORATION OF MASSACHUSETTS

BRICK MAKING MACHINE

Application filed April 4, 1929. Serial No. 352,412.

This invention relates to a brick-making machine and has for its general object to provide a novel machine especially adapted for making water struck brick and which embodies in its construction various novel features all as will be more fully hereinafter set forth.

In order to give an understanding of the invention I have illustrated in the drawings a selected embodiment thereof which will now be described after which the novel features will be pointed out in the appended claims.

In the drawings:

Fig. 3 is a view showing the reverse side from that shown in Fig. 1;

Fig. 4 is a detail showing one of the agitator elements;

Fig. 5 is an enlarged fragmentary sectional view on the line 5—5, Fig. 1;

Fig. 6 is a fragmentary sectional view through the bottom of the feed chamber and illustrating the manner in which the clay is fed into the molds;

Fig. 7 is a top plan view of the plunger;

Figure 1:
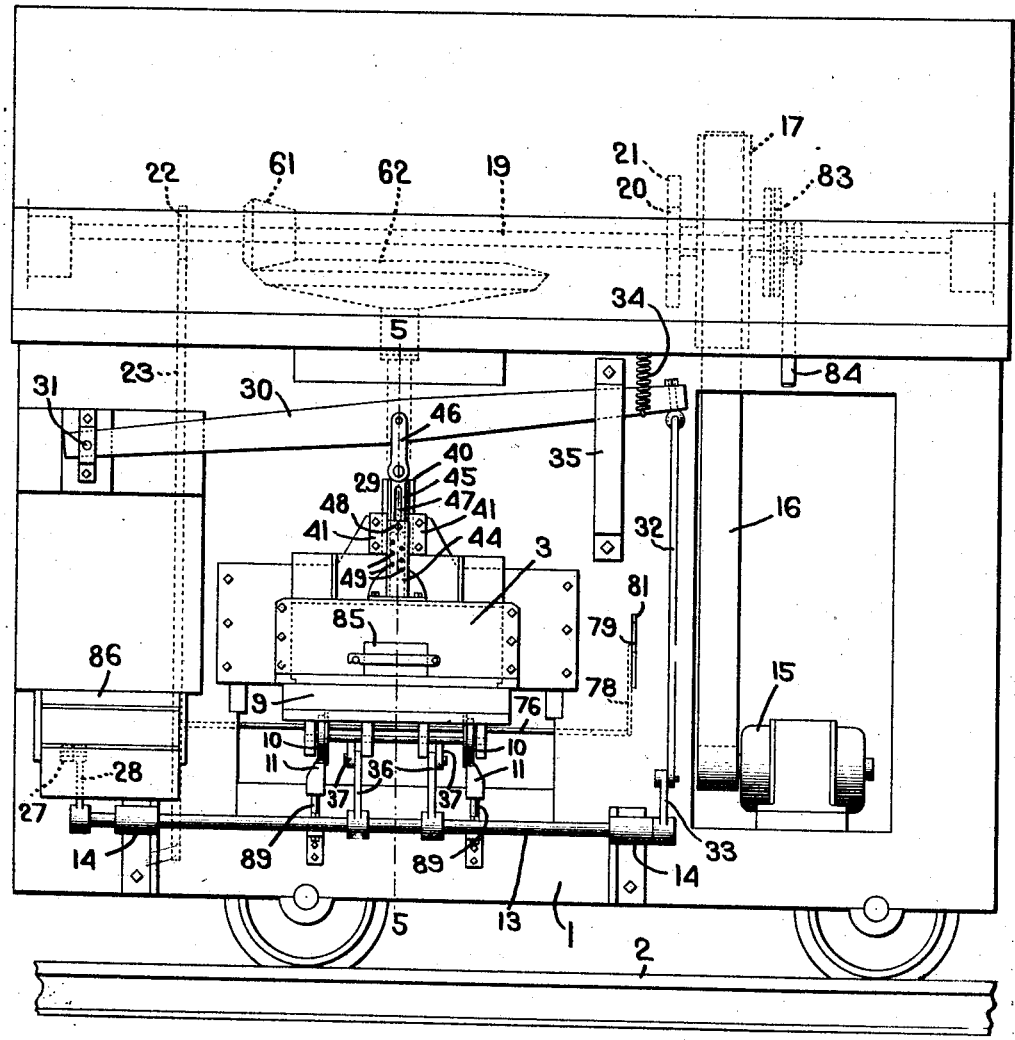
Fig. 1 is a side view of a brick-making machine embodying my invention.
Figure 2:
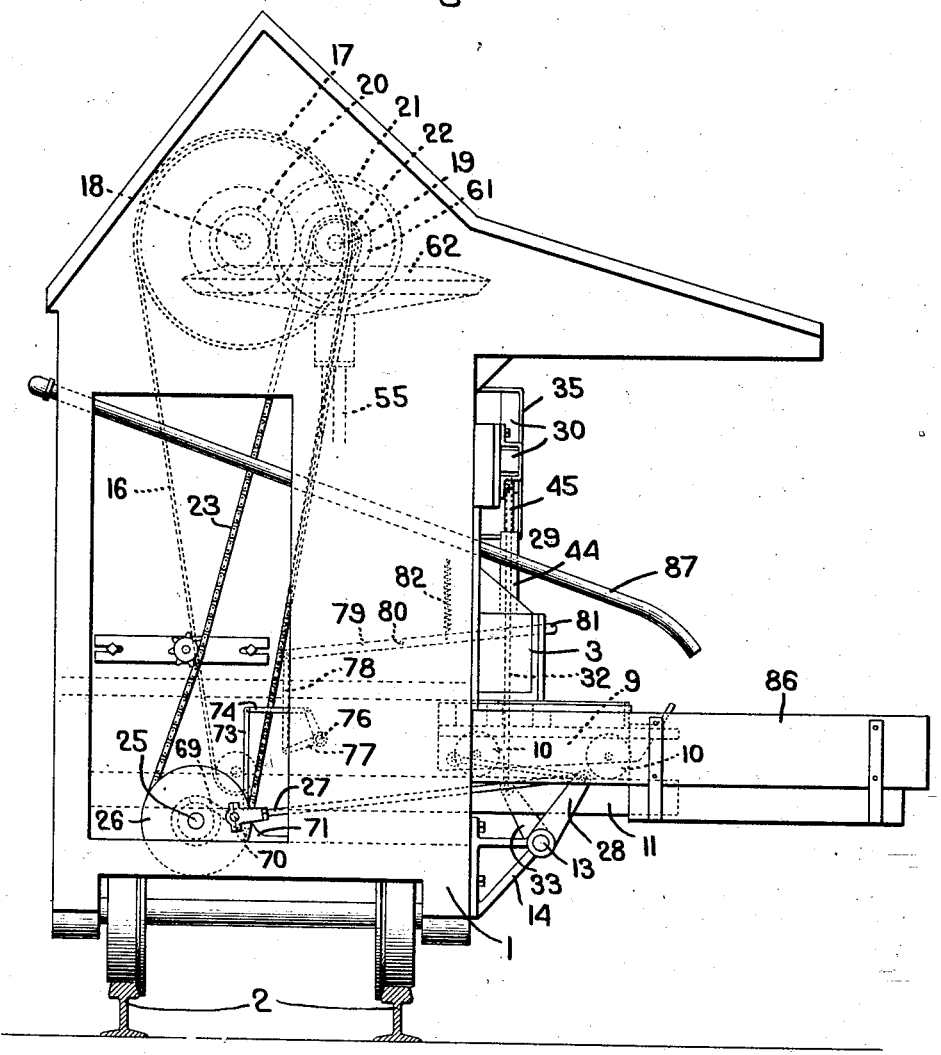
Fig. 2 is an end view thereof.
Figure 8:
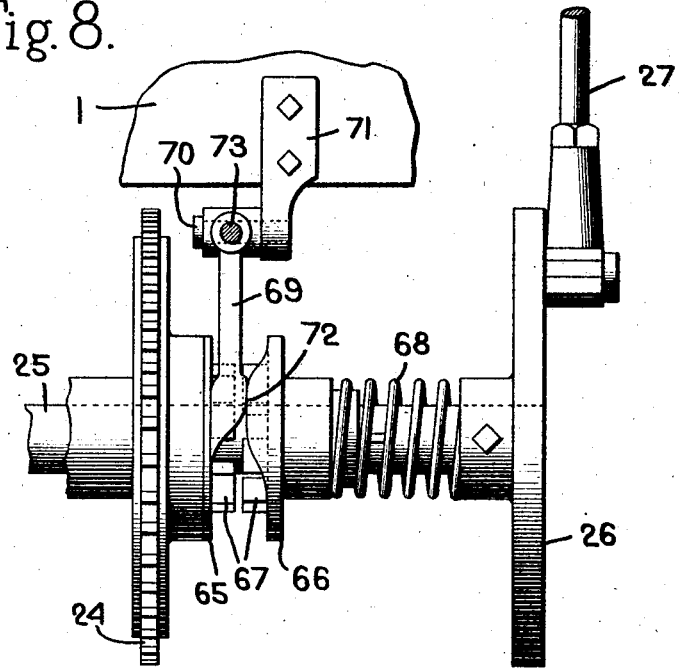
Fig. 8 is a detail view showing the controlling clutch for the operating mechanism.

The device herein shown comprises a feed chamber adapted to contain clay from which the brick is to be made and which is open at the bottom, a mold carrier operating beneath the open bottom of the chamber and adapted to carry a mold into position to receive clay from said chamber and then withdraw said mold from said position, and a puddling element adapted to mix and condition the clay, said element also operating to feed the clay into the feed chamber, and means for operating these various elements.

In the embodiment of the invention herein shown the operative parts of the device are mounted on and carried by a truck or car 1 which is shown as operating on rails 2, this construction being of advantage as it enables the brick-making mechanism to be readily shifted to different locations in the clay pit or soak pit or relative to a working platform as the work proceeds. However, it is not an essential feature of the invention that these operative parts should be mounted upon a movable car or truck.

The feed chamber which receives the clay and from which it is fed into the molds is indicated generally at 3. This chamber is open at its bottom, said chamber being herein shown as having six openings 4 therein, each opening corresponding to one mold of a gang of molds. This machine is constructed to mold six bricks at one time but, of course, it will be understood that the size of the chamber 3 and the number of bricks which are molded at one operation can be varied without in any way departing from the invention. Operating in the chamber 3 is a plunger or presser member 5 which by its downward movement serves to force the clay in the chamber 3 out through the discharge openings 4. The clay is fed into the chamber 3 through an inlet opening 6 by means which will be presently described and I will also later describe the mechanism for operating the plunger 5.

The gang mold in which the bricks are molded is indicated at 7, this mold having a plurality of mold cavities 8 each adapted to mold a brick and there being one cavity for each of the discharge openings 4.

This mold member 7 is mounted on and carried by a mold carrier 9 which is herein shown as provided with wheels 10 that operate on supporting rails 11 with which the truck or car 1 is provided. This carrier or carriage 9 is adapted to move from the full to the dotted line position in Fig. 5. When it is in the full line position the mold 7 is withdrawn from beneath the feed chamber 3 so that it can be readily removed from the carriage or replaced thereon. When the carriage is in the dotted line position the mold cavities 8 are situated directly beneath the discharge openings 4 and the mold is then in position to receive clay from the feed chamber 3.

The mold cavities 8 of the mold 7 are open at the top and bottom as usual in brick-making machines and the mold is supported on a board 12 which forms the bottom of the mold cavities and which is also removable from the carriage 9.

Means are provided for operating the plunger 5 and the carriage 9 in timed relation so that the plunger will be given its downward or operative movement when the carriage is in the dotted line position Fig. 5 and will be retracted when the carriage is in the full line position.

Situated beneath the mold carriage 1 is an operating shaft 13 which extends longitudinally of the car 1 and is mounted in suitable bearings 14 secured to the car. This shaft is given an oscillating motion and connections are provided between it and both the plunger 5 and the carriage 9 so that both of these parts are operated thereby.

While any suitable means for driving or operating the shaft may be employed I have herein shown for this purpose an electric motor 15 which is suitably mounted on the car 1. This motor is connected by a driving belt 16 to a driving pulley 17 mounted on a shaft 18, said shaft being in turn connected to a shaft 19 through suitable reducing gearing herein shown as two intermeshing gears 20 and 21 mounted on the shafts 18 and 19 respectively, the gear 20 being smaller than the gear 21.

The shaft 19 has a sprocket wheel 22 thereon which drives a sprocket chain 23 that runs over another sprocket wheel 24 loosely carried on a crank shaft 25 but which is adapted to be clutched to said crank shaft by a suitable one-revolution clutch. The crank shaft is provided with a crank disk 26 to which is connected one end of a connecting rod 27, the other end of said rod being connected to an arm 28 that is fast on the shaft 13. The rotation of the crank disk 26 will thus give to the shaft 13 the required oscillating movement to operate the plunger 5 and the carriage 9.

The plunger 5 is connected through a connecting member 29 to the intermediate portion of a lever 30, said lever being pivoted at one end to the car as shown at 31 and having connected to its other end a link 32 which in turn is connected to an arm 33 fast on the shaft 13. The oscillating movement of the shaft 13 will thus reciprocate the link 32 in a vertical direction thereby swinging the lever 30 about its pivot 31. This lever is shown as having a return spring 34 secured thereto which tends to raise it and hold it in its raised position and the free end of the lever is shown as being guided in a suitable guide 35 carried by the car 1.

The downward swinging movement of the lever 30 will operate through the connection 29 to force the plunger 5 downwardly thereby to force clay from the chamber 3 into the mold cavities 8.

I have stated above that the carriage 9 is also connected to and operated by the shaft 13. For this purpose said shaft has fast thereon a plurality of arms 36 to each of which is connected one end of a connecting rod 37, the other end of each rod being pivotally connected to the carriage 9 as shown at 38. The oscillating movement of the shaft 13 will thus also reciprocate the carriage 9.

The carriage 9 is provided with a plate 39 which closes the discharge openings 4 when the carriage is in the full line position, said plate being withdrawn from beneath the openings 4 when the carriage is in the dotted line position.

The mechanism above described is so constructed that the plunger 5 is moving downwardly as the carriage moves from the full to the dotted line position while the plunger has its upward movement during the time that the carriage is moving from the dotted to the full line position. Consequently as the carriage begins to move into the dotted line position the plunger begins its downward movement and as soon as the plate 9 begins to uncover the discharge openings 4 the clay in the chamber 3, which has been put under compression, will be forced through said openings 4 into the mold cavities 8.

The chamber 3 is herein shown as located on the outside of the car and the plunger 5 is provided with the upstanding guide element 40 which operates in ways 41 that are secured to the car. The walls 42 of the chamber 3 are preferably lined with steel plates 43, and the plunger 5 is provided with metallic wear plates 88 which engage the steel plates 43. These wear plates 88 are adjustably mounted on the plunger 5 and are for the purpose of maintaining a tight joint between the plunger and the wear plates 43, this being for the purpose of reducing wear and thus maintaining a tight joint between the periphery of the plunger 5 and the walls of the chamber.

The connection 29 between the operating lever 30 and the plunger 5 is in adjustable connection arranged so that the clay in the chamber 3 may be subjected to different degrees of pressure depending upon its condition. This connection comprises the lower twin section 44 which is rigid with the plunger 5 and the upper section 45 which is pivotally connected to the lever 30 through the medium of the link 46. The upper section 45 is located between the two parts of the twin section 44 and said section 45 is provided with a slot 47 in which is received a guiding pin 48 carried by the twin section 44. This twin section 44 is formed with a plurality of apertures 49 in any one of which a stop pin 50 may be inserted.

In the operation of the device when the lever 30 is swung downwardly the upper section 45 of the connection 29 will be carried downwardly relative to the twin section 44 until the lower end of the section 45 engages the stop pin 50 and when this occurs further downward movement of the lever 30 will be communicated to the plunger. The extent or amplitude of movement of the plunger 5 is thus governed by the position of the pin 50 and this will be determined by the character of the clay which is being used and the pressure which is required for forcing the clay through the discharge openings 4.

If a heavy pressure is required for this purpose then the pin 50 will be in one of the upper holes 49 but if a lighter pressure will suffice then the pin may be located in one of the lower holes.

The plunger is shown as provided with a vent opening 51 which is adapted to be closed by a flap valve 52. This valve is closed during the downward movement of the plunger thus preventing the clay from escaping through the vent opening but when the plunger moves upwardly the valve will open to break any vacuum which might tend to exist.

The clay is fed into the chamber 3 from a puddling or mixing chamber 53 which communicates with the chamber 3 through the inlet opening 6. This mixing chamber 53 contains an agitator or stirrer which cuts or stirs the clay and thus reduces it to a uniform consistency. This stirrer comprises a plurality of blades or arms 54 that are carried by a vertical shaft 55, said blades or arms serving to stir or agitate the clay and thus break up any lumps therein and reduce it to a uniform consistency. At the bottom of the shaft 55 is a feeding blade 56 which by its rotative movement serves to force the clay through the opening 6.

As herein shown the blades are secured to the shaft 55 in a novel way. This shaft is a square shaft and has mounted thereon a plurality of collars 57 each having an opening through which one of the blades extends. The inner end of each blade is provided with the V cut 58 to fit the shaft 55 and said blades are retained in position by pins or projections 59 which interlock into recesses formed in the collar. The collars may conveniently be made in two sections clamped or bolted together by suitable bolts 60.

The shaft 55 is shown as driven from the shaft 19 and for this purpose said shaft 19 has a small bevel gear 61 thereon which meshes with a large bevel gear 62 fast on the shaft 55.

The mixing chamber 53 is located within the car 1, the latter being provided with an opening 63 through which the clay can be introduced. In order to prevent the clay from being carried around in the chamber 53 as a mass I have placed some rods 64 in said chamber which extend from one side to the other thereof. These rods are interposed between the blades and thus prevent the clay from being carried around by the blades.

After each cycle of operations, that is, after the carriage 9 has been moved from its full line position to the dotted line position and the molds have been filled and the carriage has come back to the full line position again, it is necessary to stop the machine in order to give the operator time to remove the filled molds from the carriage and to replace them with empty molds. Accordingly I have provided a one-revolution clutch for clutching the sprocket wheel 24 to the crank shaft 25, this clutch being so designed that it will automatically disconnect the sprocket wheel from the crank shaft at the end of each revolution. The type of clutch herein shown comprises two clutch members 65, 66, each of which is provided with clutch projections 67 adapted to engage those of the other clutch member.

The clutch member 65 is rigid with the sprocket wheel which is loosely mounted on the shaft 25 while the clutch member 66 is splined to the shaft 25 and is slidable longitudinally thereof. This clutch member 66 is acted on by a clutch spring 68 which normally tends to throw the clutch projections into engagement. The clutch is controlled by a clutch dog 69 which is fast on a rock shaft 70 that is journalled in suitable bearings 71. When the rock shaft is turned to raise the clutch dog into the dotted line position Fig. 9 then the clutch member 66 is released and the spring 58 will automatically throw said clutch member 66 into clutching engagement with the member 65. When the clutch dog is lowered into the full line position Fig. 9 then it is in position to disengage the clutch automatically at the end of the cycle of operations.

Figure 9:
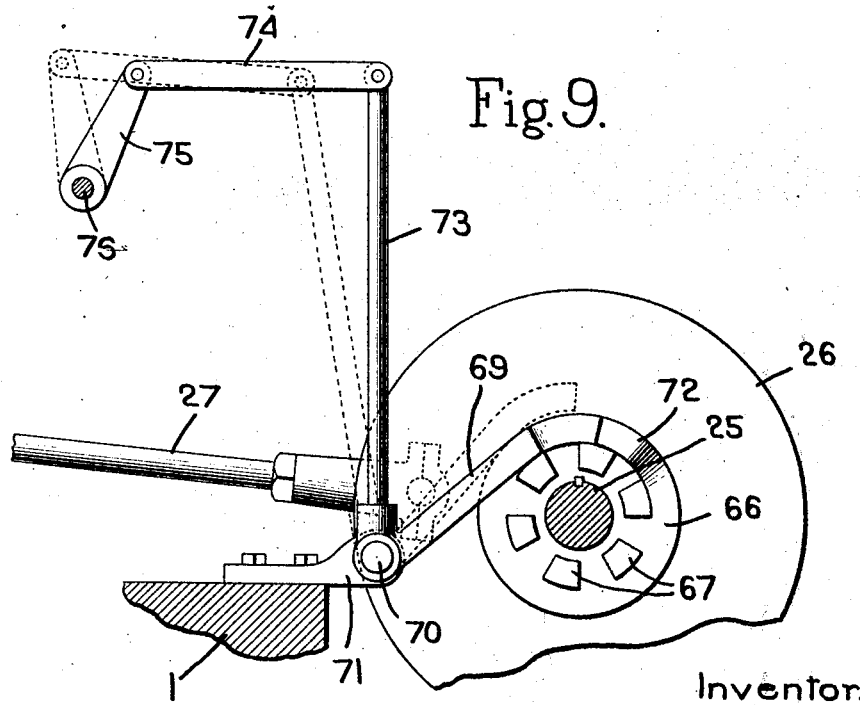
Fig. 9 is a side elevation of the clutch-controlling mechanism.

The clutch member 66 is shown as having a cam projection 72 which co-operates with the clutch dog 69 to disengage the clutch when said dog is in the full line position Fig. 9 in a manner well known in one-revolution clutches.

The rock shaft 70 has rigid therewith an operating arm 73 which is connected by a link 74 to an arm 75 on another rock shaft 76 and this latter rock shaft has still another arm 77 rigid therewith which is connected by a link 78 to one end of a clutch-controlling lever 79 pivoted to the car at 80, the free end 81 of said lever projecting outside of the car and being accessible to the operator who is positioned adjacent the carriage 9.

The clutch lever 79 is shown as acted on by a spring 82 which normally tends to hold the lever in its raised position, which is the position corresponding to the full line position of the clutch dog in Fig. 9. When the operator desires to start the machine in operation he depresses the free end of the lever 81 and this raises the clutch dog 69 thus allowing the clutch to become engaged. The operator may then release the lever 81 and the spring 82 will return the clutch dog 69 to its operative position so that when the shaft 25 completes its revolution the clutch will be automatically disengaged.

In addition to the clutch above described I have also provided a clutch 83 by which the pulley 17 is clutched to the shaft 19, said clutch 83 having an actuating lever 84 by which it may be manipulated. When the clutch 83 is disengaged then the entire mechanism will be idle. The clutch comprising the clutch members 65, 66, however, merely controls the oscillation of the shaft 13 and the parts operated thereby.

In the making of water-struck brick it is necessary to keep the mold wet and I have provided herein a tank 86 into which the mold 7 may be dipped just before it is placed on the mold carrier and thereby providing the necessary wet mold for the reception of the clay. This tank may be kept filled with water from a supply pipe 87.

The chamber 3 is provided with a clean-out opening that is normally closed by a door or panel 85. This door, however, can be readily opened whenever it is necessary to obtain access to the chamber.

I have shown the rails 11 as supported on adjustable supports 89, the purpose of these being to provide for adjusting the rails if such adjustment is necessary in order to maintain a tight joint between the plate 39 and the bottom of the chamber.

While I have illustrated herein a selected embodiment of the invention I do not wish to be limited to the constructional features shown.

I claim:

1. In a brick forming machine, the combination with a feed chamber having an open bottom, of a mold carrier movable to bring a mold into and out of position to receive clay from said chamber, a plunger operating in the chamber to force clay through the open bottom thereof into the mold, a rock shaft situated beneath the mold carrier, arms on said rock shaft, a connection between one arm and the mold carrier and between another arm and the plunger, and means to oscillate the shaft.

2. In a brick-making machine, the combination with a chamber having an open bottom, of means to feed clay to said chamber, a mold carrier, a track on which said mold carrier moves to bring a mold supported thereby into and out of register with the open bottom of the chamber, a plunger operating in said chamber to force clay therefrom into the mold, a rock shaft, means for oscillating the latter, a connection between said rock shaft and said mold carrier, a lever for actuating the plunger, and connections between said lever and said rock shaft, whereby oscillations of the rock shaft operate both the mold carrier and the plunger.

3. In a brick-making machine, the combination with a chamber having an open bottom, of a mold carrier movable to bring a mold into and out of register with the open bottom, said carrier having means to close the bottom when the mold is out of register therewith, a plunger operating in said chamber to force clay through the open bottom, a rock shaft, connections between the rock shaft and both the mold carrier and plunger, a motor and operative connections between the motor and rock shaft for oscillating the latter and including a one-revolution clutch which becomes automatically disengaged at the end of each complete oscillation.

4. In a brick-making machine, the combination with a feed chamber having an open bottom, a mold carrier movable to bring a mold into and out of register with said open bottom, a plunger for forcing the clay from the mold chamber through the open bottom, a lever for actuating the plunger pivoted at one end to a fixed point, a rock shaft, means for actuating the rock shaft, means connecting the rock shaft to the other end of the lever, and an adjustable connection between the plunger and an intermediate portion of the lever.

5. In a brick-making machine, the combination with a feed chamber having an open bottom, a mold carrier movable to bring a mold into and out of register with said open bottom, a plunger for forcing the clay from the mold chamber through the open bottom, a lever for actuating the plunger, a connection between the lever and the plunger comprising two members, one of which is free to slide on the other, and means to limit the amount of relative movement between said members.

6. In a brick-making machine, the combination with a feed chamber having an open bottom, of a mold carrier movable to bring a mold into and out of register with the open bottom, a plunger operating in the feed chamber, a lever for operating the plunger, and a connection between the lever and plunger comprising two sections having a free telescopic relation, and adjustable means for limiting said telescopic movements.

7. In a brick-forming machine, the combination with a feed chamber having an open bottom, of a mold carrier movable to bring a mold into and out of position to receive clay from said chamber, a plunger operating in the chamber to force clay through the open bottom thereof into the mold, a rock shaft, means including a one-revolution clutch to oscillate said rock shaft, and to bring it to rest at the end of each complete oscillation, and operative connections between said shaft and both the mold carrier and the plunger.

8. In a brick-forming machine, the combination with a feed chamber having an open bottom, of a mold carrier movable to bring a mold into and out of position to receive clay from said chamber, a plunger operating in the chamber to force clay through the open bottom thereof into the mold, a mixing chamber, an agitator therein, driving means for the agitator, a rock shaft, operative connections between said shaft and both the mold carrier and the plunger, and means including a one-revolution clutch for driving the rock shaft from the means for actuating the agitator.

In testimony whereof, I have signed my name to this specification.

ROBERT A. PARRY.